United States Patent [19]

Wald et al.

[11] Patent Number: 5,790,123

[45] Date of Patent: Aug. 4, 1998

[54] METHOD FOR GENERATING AND MODIFYING SIMULATED TERRAIN SURFACES AND REPRESENTING TERRAIN RELATED PROCESSES

[75] Inventors: Joseph K. Wald, Newark, Del.; Carolyn J. Patterson, Perryville; MaryAnne Fields, Conowingo, both of Md.

[73] Assignee: The United States of America as represented by the Secretary of the Army, Washington, D.C.

[21] Appl. No.: 536,390

[22] Filed: Sep. 29, 1995

[51] Int. Cl.⁶ .................................................. G06T 17/00
[52] U.S. Cl. .............................................. 345/419
[58] Field of Search ................................ 345/419, 420, 345/425–433, 435, 441

[56] References Cited

PUBLICATIONS

Murakamie et al. "A Three–Dimemsional Dialog Method by Mt. ball Technique", May 1993.

*Primary Examiner*—Almis R. Jankus
*Attorney, Agent, or Firm*—Paul S. Clohan; Frank J. Dynda

[57] ABSTRACT

A computational methodology significantly enhances the prior art representation of terrain and terrain-related processes. This methodology allows for the representation of terrain as a smooth surface containing realistic terrain features with a variable amount of terrain detail. The design includes improved methodology for the generation of examples of a variety of general terrain types as well as the representation of existing geographical areas. The process of surface construction insures that the surface has characteristics that accurately reflect the terrain under consideration, whether the representation is of a general terrain type (generic) or of a specific geographical area. As a consequence of the smooth surface being defined at every point of the geographical area, this terrain representation has infinite resolution.

10 Claims, 14 Drawing Sheets

5,790,123

METHOD FOR GENERATING AND MODIFYING SIMULATED TERRAIN SURFACES AND REPRESENTING TERRAIN RELATED PROCESSES

TECHNICAL FIELD

The present invention relates to an improved computational methodology for representation of terrain and terrain-related phenomena.

BACKGROUND ART

In many fields, including, but not limited to, such diverse categories as civil engineering, meteorology, computer games, scientific visualization, and military science, there is a need for increasingly detailed, high resolution, representation of terrain and the interaction of natural and man made processes with that terrain. The prior art terrain representation methodologies are generally a collection of isolated terrain heights. These heights are obtained by measurement, either directly, using surveying equipment, or indirectly, by estimation from photographs or contour maps and stored in mathematical arrays. Occasionally, simple sine/cosine functions are used to store measured terrain heights.

Existing mathematical methods to estimate terrain heights in between measured terrain heights all involve empirical manipulations using some subset of the surrounding measured heights and are not holistically based.

Other prior art methodologies utilize fractals to generate pictures of general terrain types, but since these methods are statistically based, the resulting representation is a set of isolated terrain heights, and not a smooth surface. In fact, by their very nature, fractals cannot produce a smooth surface.

It is accordingly one object of the present invention to provide a method for the improved representation of terrain and terrain-related phenomena.

Another object of the present invention is to provide a method for the improved representation of terrain and terrain-related phenomena as a smooth surface.

Yet another object of the present invention is to provide a method for the improved representation of terrain and terrain-related phenomena containing realistic terrain features with a variable amount of terrain detail.

A further object of the present invention is to provide a method for the improved representation of terrain and terrain-related phenomena permitting generation of a variety of general terrain types.

It is yet another object of the present invention to provide a method for the improved representation of terrain of existing geographical areas.

It is a further object of the present invention to provide a method for the improved representation of terrain and terrain-related phenomena applying a holistic approach to terrain representation.

Another object of the present invention is to provide a method for the improved representation of terrain and terrain-related phenomena facilitating the design of routes and road networks.

DISCLOSURE OF THE INVENTION

These and other objects are achieved by the method for representating terrain and terrain-related phenomena according to the present invention.

The method comprises the steps of (a) specifying a density parameter for the terrain; (b) selecting a range of scales; (c) determining a total number of hills to be constructed; (d) obtaining mathematical distributions of terrain features for each hill to be constructed; (e) generating values for the location and shape of each hill to be constructed; and (f) superposing the values with an arbitrarily oriented plane to form a variable resolution terrain surface representative of the terrain or terrain related phenomena.

The step of obtaining mathematical distributions of terrain features for each hill to be constructed is performed according to the equation:

$$\int_{s=s_{min}}^{s=\infty} Ks^{-2}ds = \frac{K}{s_{min}},$$

where s is the scale of the terrain feature selected in step (b) and K is the density parameter specified in step (a).

The method further comprises the step of adding user selectable hills to the terrain surface.

The values for the location and shape of each hill to be constructed are generated according to the equation:

$$f_k(x, y) = s_k h_k \exp\left(-\left\{\frac{1}{s_k \rho_k}[\alpha_k E_k(x, y) + (1-\alpha_k) M_k(x, y)]\right\}^{\sigma_k}\right),$$

where $$E_k(x, y) = [a_1(x-\xi_k)^2 - a_2(x-\xi_k)(y-\eta_k) + a_3(y-\eta_k)^2]^{\frac{1}{2}},$$

$$a_1 = \epsilon_k - \left(\epsilon_k - \frac{1}{\epsilon_k}\right)\cos^2\lambda_k,$$

$$a_2 = \left(\epsilon_k - \frac{1}{\epsilon_k}\right)\sin 2\lambda_k,$$

and $$a_3 = \epsilon_k - \left(\epsilon_k - \frac{1}{\epsilon_k}\right)\sin^2\lambda_k,$$

and $$M_k(x, y) = \max\left(\epsilon_k |A_1(x, y)|, \frac{1}{\epsilon_k}|A_2(x, y)|\right),$$

where $$A_1(x, y) = (x - \xi_k)\cos\lambda_k + (y - \eta_k)\sin\lambda_k,$$

and $$A_2(x, y) = (y - \eta_k)\cos\lambda_k - (x - \xi_k)\sin\lambda_k,$$

$\xi_k$ and $\eta_k$ govern the location of the center of the hill, $h_k$, $\rho_k$, and $S_k$ govern the hill's height and width, $\epsilon_k$ governs the eccentricity of the hill, $\lambda_k$ governs the hill's orientation, $\sigma_k$ governs the slope, and $\alpha_k$ governs the shape of the horizontal cross section of the hill.

According to the present invention, the terrain represented may be a specific geographic area, in which case the step of generating values for the location and shape of each hill to be constructed comprises (a) detrending a set of measured heights to produce a set of residual heights; (b) locating the residual height of maximum deviation and the location of the residual height; (c) defining a hill whose center is at or near the location of the residual height and whose height is substantially equal to the residual height; (d) subtracting the defined hill from the set of residual heights to create a new set of residual height; (e) locating the new residual height of maximum deviation and the location of the new residual height; and (f) repeating steps (c) through (e) until all of the new set of residual heights are smaller in absolute value than the predefined threshold value.

The step of detrending the set of measured heights is achieved by fitting a plane through the measured heights and subtracting the height of this plane from each of the measured heights.

The method may further comprise the step of adding micro-terrain to the terrain surface. In such a case, the method includes the steps of (a) decomposing the micro-terrain into homogenous sections; (b) determining an empirical statistical distribution for each variable resolution terrain parameter for a section; (c) selecting the minimum scale value for the micro-terrain; (d) creating the micro-hills for a section; (e) repeating steps (b) through (d) for each section; and (f) adding the micro-hills to the terrain surface.

The step of creating the micro-hills comprises determining the scales of the micro-hill according to the cumulative distribution function $$\int_{t=s_{micro}}^{t=s} Kr^{-2} dt = K(1/s_{micro} - 1/s),$$

where $s_{micro}$ is the minimum scale selected in step (c) and K is the density parameter used in step (a).

The method may further comprise the step of modifying the terrain surface after initial definition, in which case the method includes the steps of (a) selecting an area of the surface to be modified; (b) defining a grid of digitized terrain heights in the area; (c) determining a set of variable resolution terrain hills that approximate the digitized heights to within a predefined threshold value; and (d) subtracting the set of variable resolution terrain hills from the variable resolution terrain surface.

The method may further comprise the step of adding user selectable hills to the terrain surface.

According to another aspect of the invention, the method may further comprise the step of automatically selecting a network of travel routes over the variable resolution terrain surface. In this instance, the method includes the steps of (a) selecting a point on the variable resolution terrain surface as the central node for the network; (b) determining a set of major arteries; and (c) determining a set of local roads.

Preferably, the steps of determining a set of major arteries and determining a set of local roads comprises calculating necessary terrain gradients and sideslopes.

According to yet another aspect of the invention, the method further comprises the step of representing terrain related processes. In which case reaction diffusion equations are used.

The values for the location and shape of each hill to be constructed may be computed in the rectangular or spherical coordinate systems.

BEST MODE FOR CARRYING OUT THE INVENTION

Figure 1A:
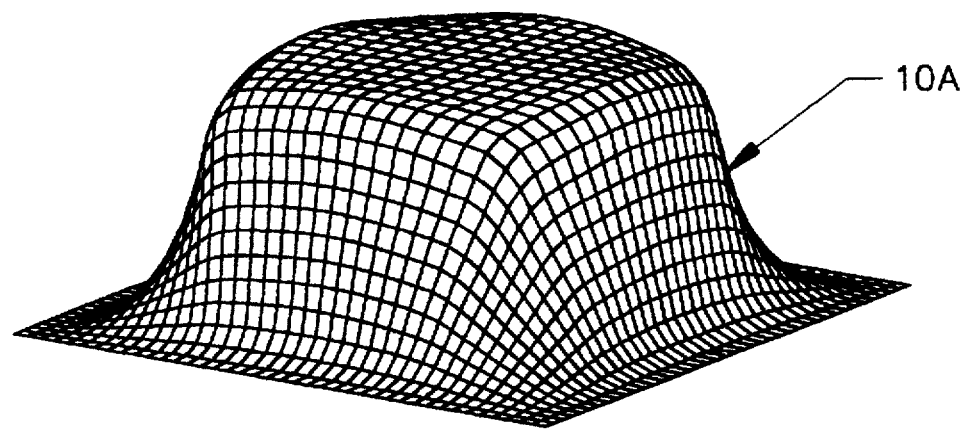
FIGS. 1(a) through 1(i) depict examples of various individual hill shapes that can be constructed by the methodology of the present invention.
Figure 1B:
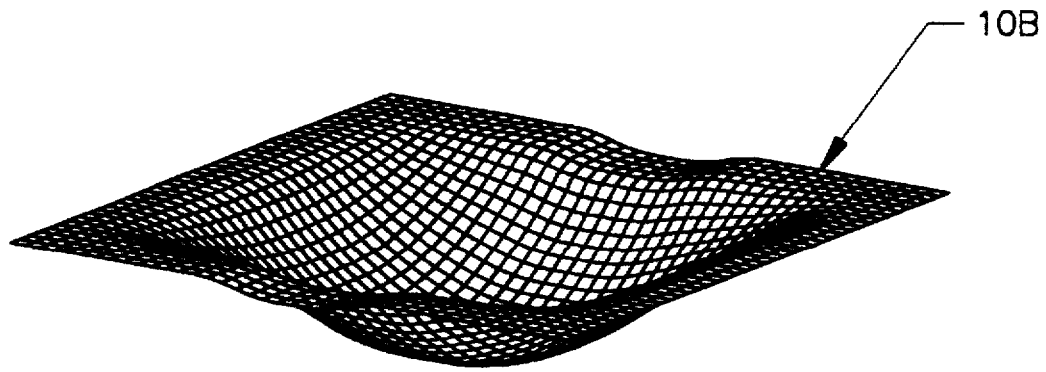
Figure 1C:
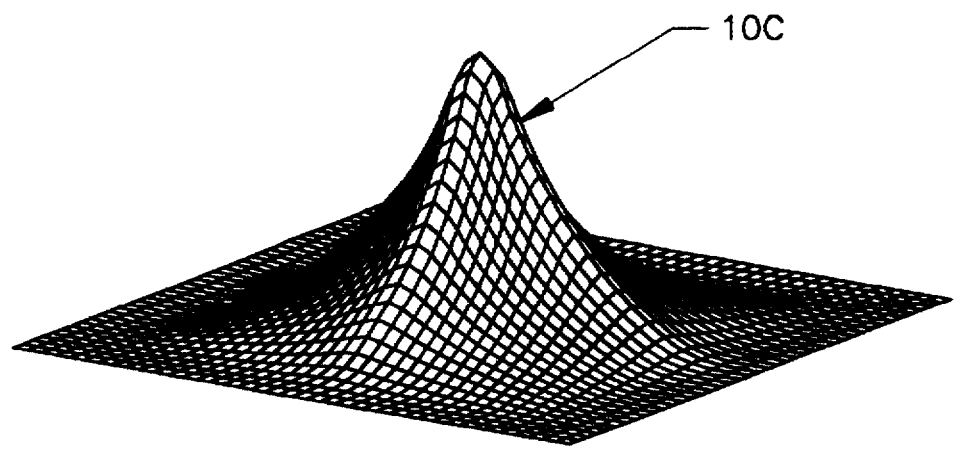
Figure 1D:
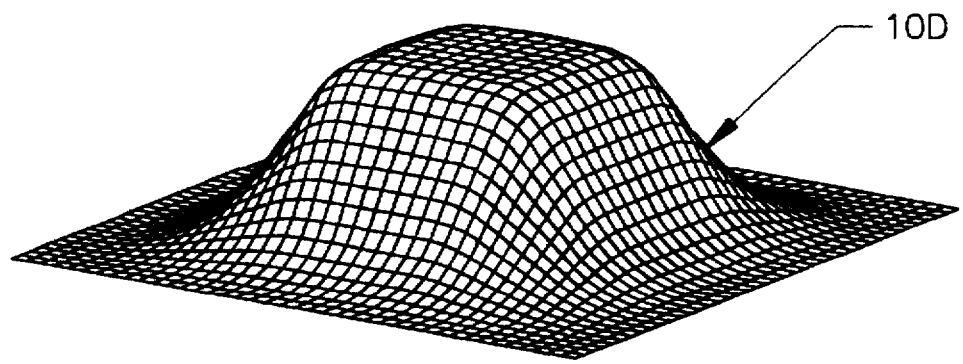
Figure 1E:
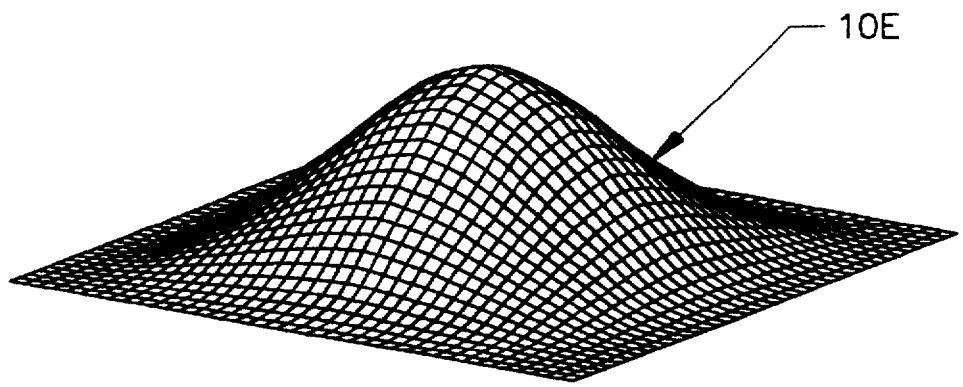
Figure 1F:
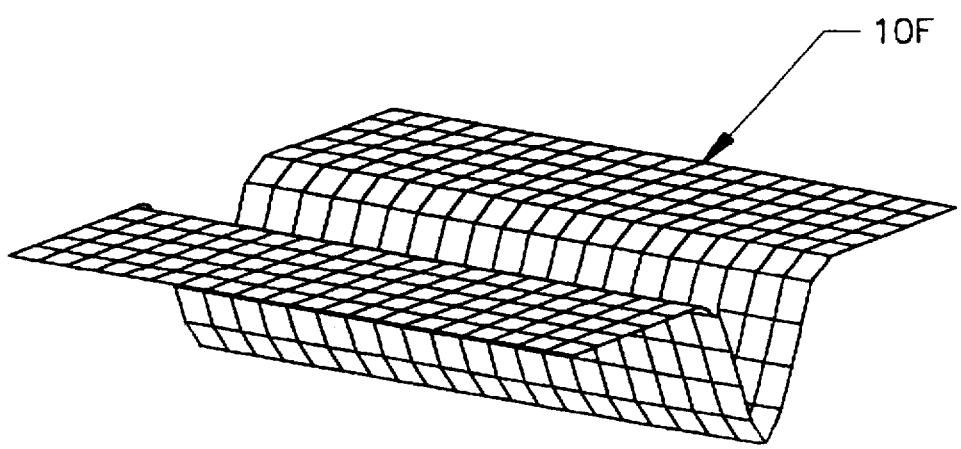
Figure 1G:
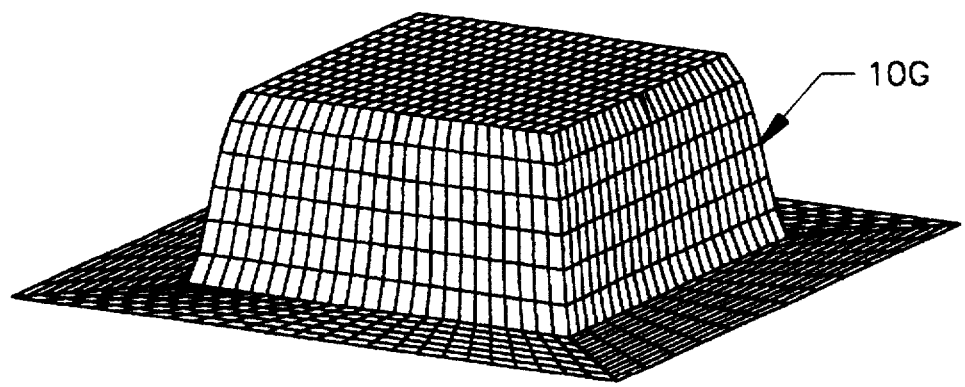
Figure 1H:
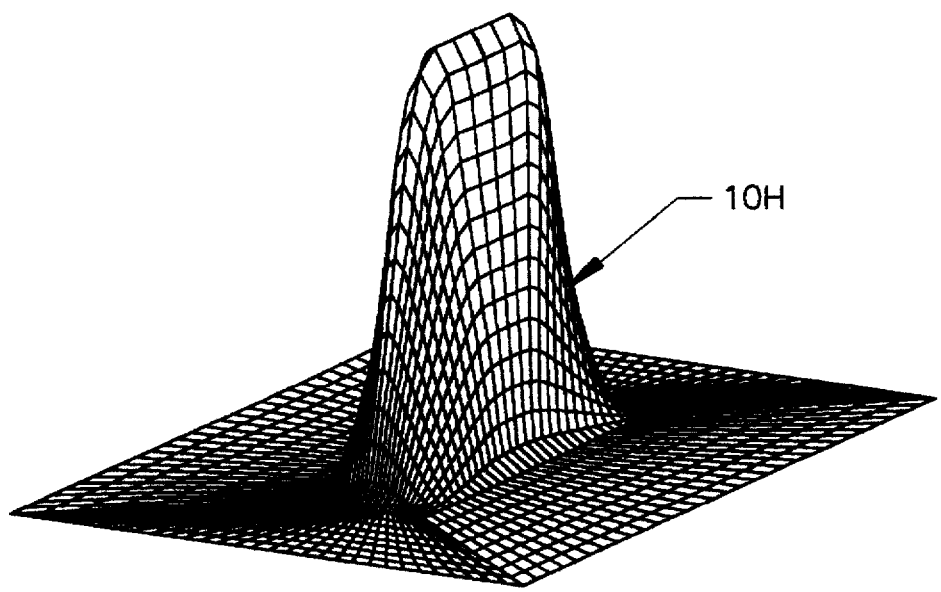
Figure 1I:
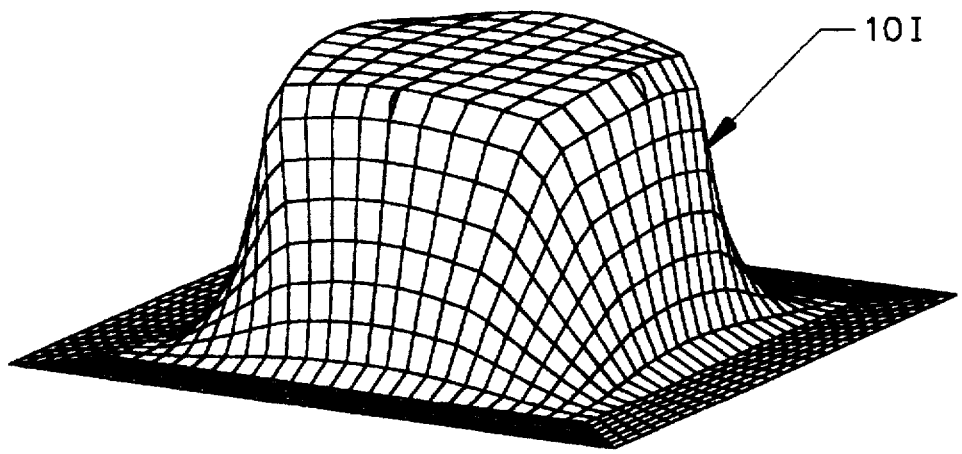

FIGS. 1(a) through 1(i) depict examples of various hill shapes 10A through 10I, respectively, that can be constructed by the methodology of the present invention. The computational methodology of the present invention significantly enhances the prior art representation of terrain and terrain-related processes. This methodology allows for the representation of terrain as a smooth surface containing realistic terrain features with a variable amount of terrain detail. Here, the term "smooth surface" is defined to be a continuous mathematical surface that has continuous partial derivatives of all orders almost everywhere, except possibly at a set of measure zero. The design includes improved methodology for the generation of examples of a variety of general terrain types as well as the representation of existing geographical areas. The theory underlying the process of surface construction, a holistic approach based on the idea of self-similarity, insures that the surface has characteristics that accurately reflect the terrain under consideration, whether the representation is of a general terrain type (generic) or of a specific geographical area. As a consequence of the smooth surface being defined at every point of the geographical area, this terrain representation has infinite resolution.

The holistic approach to terrain representation is not based on individual terrain heights, but rather regards the terrain as a unified whole. The terrain surface is conceived as the superposition of many individual terrain features of different sizes and shapes. For example, a typical complex surface is made of a few large terrain features or "hills", more mid-size hills, and very many small hills. The larger the hill, the wider the geographic area that it influences. Hills with negative heights are valleys.

The mathematical density function that governs the relative proportion of hill sizes is based on the concept of "self-similarity" or independence of scale. The defining equation is $$D=Ks^{-2},$$

where s is the scale of the terrain feature, K is a proportionality constant depending on terrain type, and D is the density of terrain features as a function of scale. If $S_{min}$ is the scale of the smallest terrain feature represented, then the total number of hills per unit area is obtained by integrating the power law from $S_{min}$ to $\infty$, i.e., $$\int_{s=s_{min}}^{s=\infty} Ks^{-2}ds = \frac{K}{s_{min}},$$

and the cumulative areal distribution of hills as a function of s is given by $$\int_{t=s_{min}}^{t=s} Kt^{-2}dt = K(1/s_{min} - 1/s).$$

There are, of course, real world restrictions on the range of scales, $[s_{min}, s_{max}]$, for which self-similarity holds. In the methodology described here, $s^5$in can be adjusted to control the amount of detail used in the application.

Since the terrain surface is a unified whole, extending continuously over the entire geographic area, the resolution capability of the terrain surface is truly infinite. For a continuous surface, the concepts of detail and resolution diverge. The amount of detail in the terrain surface is defined by the scale of the smallest hill, while the resolution of any continuous surface is infinite. Thus, the methodology of the present invention for terrain representation provides the ability to construct terrain surfaces with as much or as little surface detail as desired with infinite resolution.

In examples of real terrain, all of the terrain features do not look exactly the same. The methodology of the present invention addresses this by including a series of mathematical parameters for each hill. These parameters govern both the shape and location of each hill. By using somewhat different sets of parameters for different hills, the hills take on somewhat different shapes, for example, hills 10A through 10 of FIGS. 1(a) through 1(i), respectively. The shape of each hill can be specified by the user, or it can be selected randomly by the methodology. Thus, a terrain-surface can be completely custom designed, generated completely randomly, or a combination of both techniques can be used. Corresponding to each hill is a mathematical function that contains the parameters peculiar to that hill:

$$f_k(x, y) = s_k h_k \exp\left(-\left\{\frac{1}{s_k \rho_k}\left[\alpha_k E_k(x, y) + (1 - \alpha_k) M_k(x, y)\right]\right\}^{\sigma_k}\right),$$

where $$E_k(x, y) = [a_1(x - \xi_k)^2 - a_2(x - \xi_k)(y - \eta_k) + a_3(y - \eta_k)^2]^{\frac{1}{2}},$$

$$a_1 = \epsilon_k - \left(\epsilon_k - \frac{1}{\epsilon_k}\right)\cos^2\lambda_k,$$

$$a_2 = \left(\epsilon_k - \frac{1}{\epsilon_k}\right)\sin 2\lambda_k,$$

and $$a_3 = \epsilon_k - \left(\epsilon_k - \frac{1}{\epsilon_k}\right)\sin^2\lambda_k,$$

and $$M_k(x, y) = \max\left(\epsilon_k |A_1(x, y)|, \frac{1}{\epsilon_k}|A_2(x, y)|\right),$$

where $$A_1(x, y) = (x - \xi_k)\cos\lambda_k + (y - \eta_k)\sin\lambda_k,$$

and $$A_2(x, y) = (y - \eta_k)\cos\lambda_k - (x - \xi_k)\sin\lambda_k.$$

Varying the parameters $a_k$, $\xi_k$, $\eta_k$, $h_k$, $\rho_k$, $\epsilon_k$, $\lambda_k$, $\sigma_k$, $S_k$ produces hills in a variety of sizes and shapes. While all of the parameters interact to some extent, roughly speaking, the parameters $\xi_k$ and $\eta_k$ govern the location of the "center" of the hill, $h_k$, $\rho_k$, and $S_k$ govern the hill's "height" and "width", $\epsilon_k$ governs the "eccentricity" of the hill, $\lambda_k$ governs the hill's "orientation," and $\sigma_k$ governs the "slope."

The parameter $\alpha_k$, whose value always lies in the interval [0,1], governs the shape of the horizontal cross section of the hill. When $\alpha_k = 1$, this cross section is elliptical; when $\alpha_k = 0$, it is rectangular. For other values of $\alpha_k$, the cross section has a more complex geometry. Rectangular hills are useful in the modeling of houses, roads, and other man made objects as integral elements of the terrain. FIG. 1 depicts a selection from the infinite number of different individual hill shapes that can be constructed by varying the above parameters.

In order to allow for the possibility that the entire piece of terrain is on a slope, an arbitrarily oriented plane, P(x,y), is included in the representation:

$$P(x,y) = z_0 + x_s(x - x_0) + y_s(y - y_0),$$

where $x_0$, $y_0$, $z_0$, $x_s$, and $y_s$ are all selectable parameters.

The actual representation of the surface, T(x, y), is generated simply by adding together the plane and all of these mathematical functions:

$$T(x, y) = P(x, y) + \sum_{k=1}^{N} f_k(x, y).$$

For generic variable resolution terrain surfaces, statistical distributions govern how the parameters are selected for each hill. The actual selection process is accomplished by using a random number generator to change the hill parameters from one hill to the next. If the initial value of the random number generator (called the random number "seed") is changed, then the set of parameters selected for each hill is changed. This, in turn, changes both the shape and the location of each hill. Thus, simply by changing the random number seed, a different example of the same type of terrain can be created. This provides a very easy way of producing many similar, but distinct examples of a given terrain type.

Figure 2:
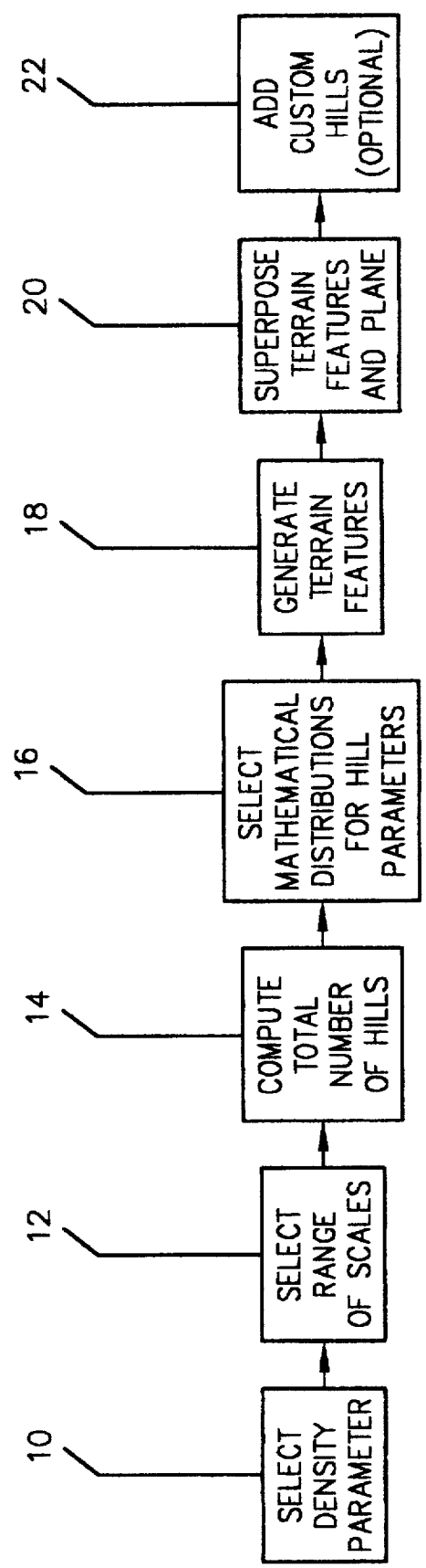
FIG. 2 shows a flow chart of the methodology for the construction of generic terrain.
Figure 3:
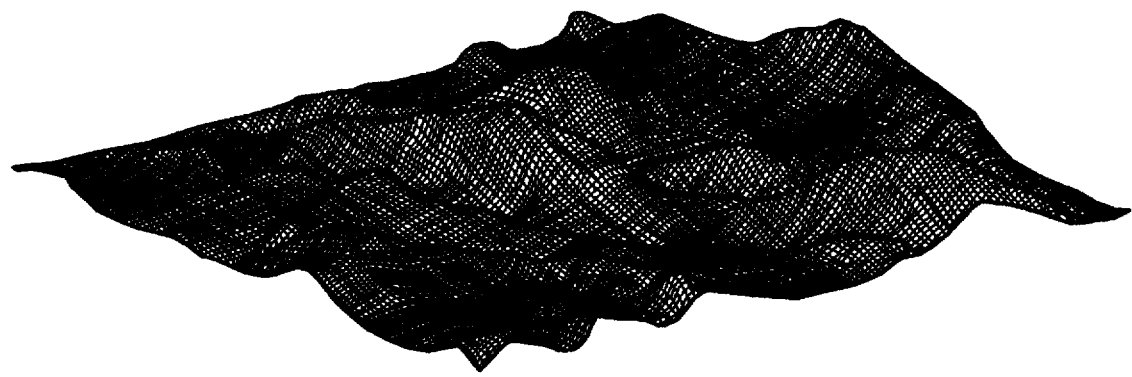
FIG. 3 is a simple graphical representation of a typical example of generic terrain created by the process of FIG. 2.

FIG. 2 is a flow chart of the methodology for the construction of generic terrain. In block 10, the general terrain type, and hence the corresponding value of K, is specified. In block 12, the range of scales $[S_{min}, S_{max}]$ is specified. Based on these values, the total number of hills to be constructed is computed in block 14. The forms of the mathematical distributions for the hill parameters are specified in block 16. Random draws from these distributions specify, in block 18, the location and shape of each of the terrain features. In block 20, all of the terrain features are superposed together with an arbitrarily oriented plane to form the whole terrain surface. If additional custom designed hills are to be added to the surface, this is accomplished in block 22. FIG. 3 shows a simple graphical representation of a typical example of generic terrain created by this process. All graphical representations of terrain shown here are depicted as simple "wire-frame" diagrams to emphasize that the essence of the methodology is in the mathematical formulation and not in sophisticated color graphics.

Figure 4:
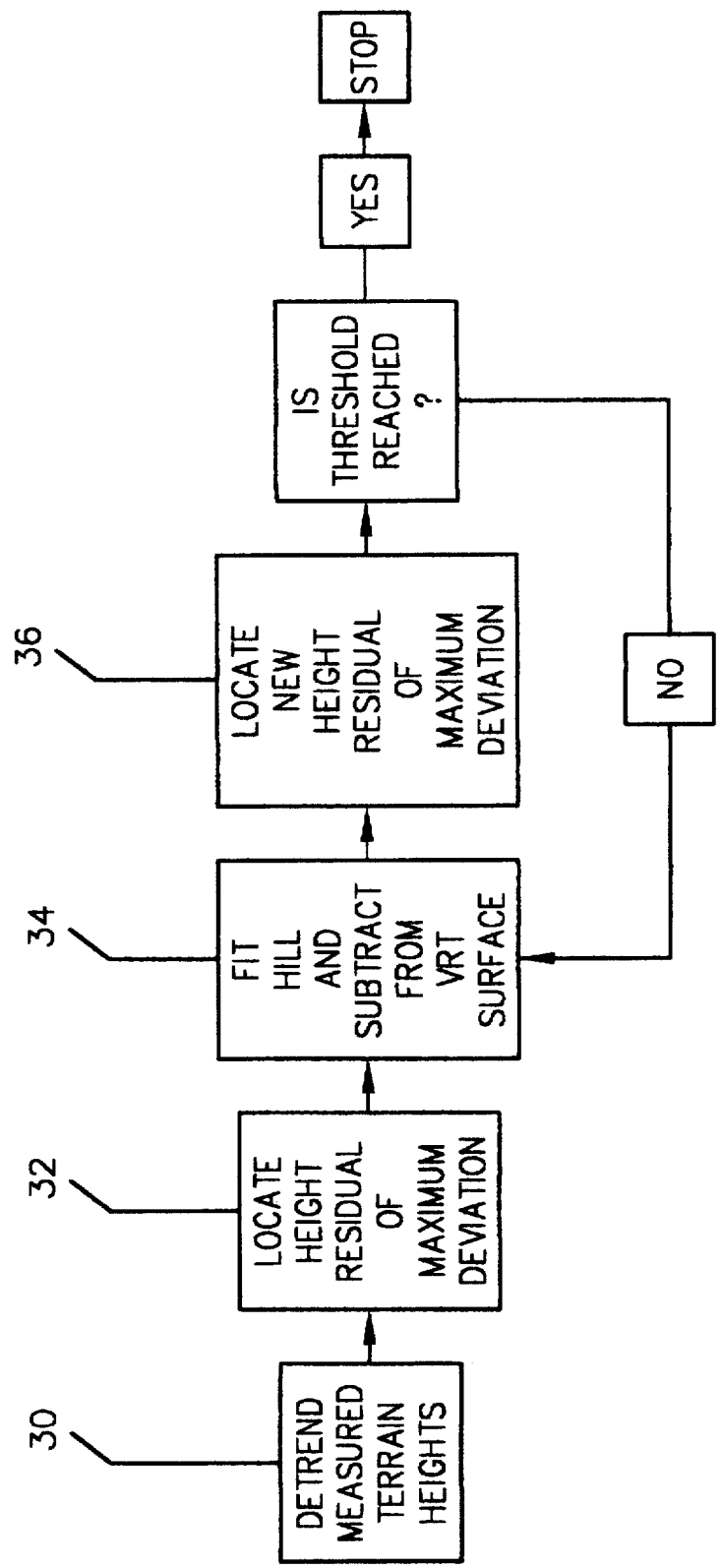
FIG. 4 is a flow chart of the methodology for the representation of an existing geographical area.

FIG. 4 is a flow chart of the methodology for the representation of an existing geographical area. The first step in the process of fitting a variable resolution terrain surface to a set of measured heights is depicted in block 30 and consists of detrending the heights by fitting a plane through them and subtracting the height of this plane from each of the measured heights. This produces "residual" heights. The plane may correspond to the smallest measured height or it may be defined by a mathematical process called a least-squares procedure.

Next the residual height (x,y,d) of maximum deviation, or absolute value, is found (block 32) and a hill is defined, whose center is at or near (x,y) and whose height is equal to or close to d. An iterative loop is used to find the best values of the variable resolution terrain parameters in the construction of this hill. Here, the best hill is the one that leaves the smallest modified residual heights in the neighborhood of (x, y) when the hill is subtracted from the residual heights. This hill is subtracted from each of the residual heights to create a new set of residual heights. This part of the process is represented by block 34.

Next, the new highest residual height is found (block 36), and the above hill fitting process is repeated until all of the residual heights are smaller in absolute value than 8, a predefined threshold value. The variable resolution terrain surface T(x, y) is then defined to be the sum of the fitting plane and all of the fitting hills. By the method of construction, T(x,y) is guaranteed to agree with all of the original measured terrain heights to within $\delta$.

Figure 5:
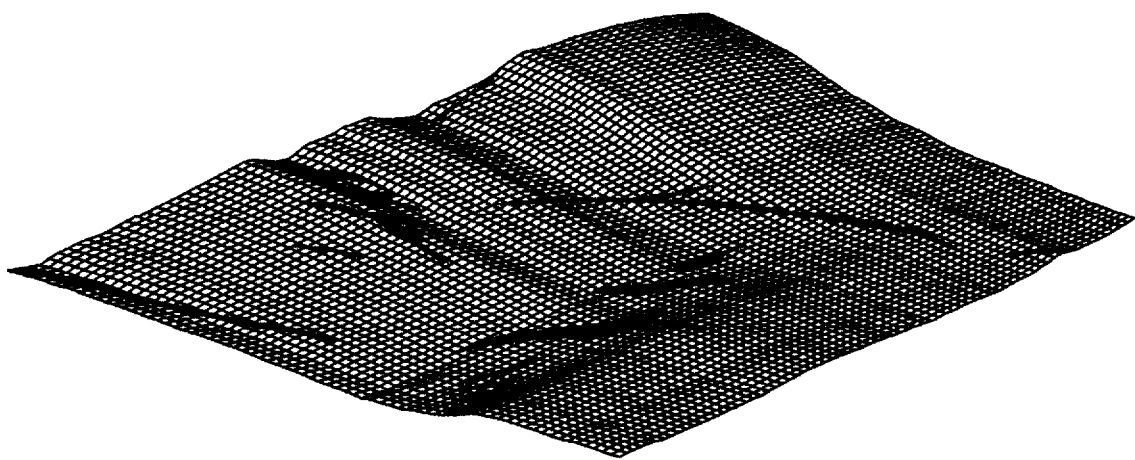
FIG. 5 is a simple graphical representation of the square kilometer created by the process of FIG. 4.

The terrain fitting process has been experimentally verified using a 1 kilometer square of terrain located near Denver, Colo. The terrain heights were provided by the U.S. Army Topographic Engineering Center. This existing geographical area has been successfully represented by variable resolution terrain surfaces for $\delta=1$, 2, and 5 meters. A simple graphical representation of the square kilometer created by this process appears in FIG. 5.

Figure 6:
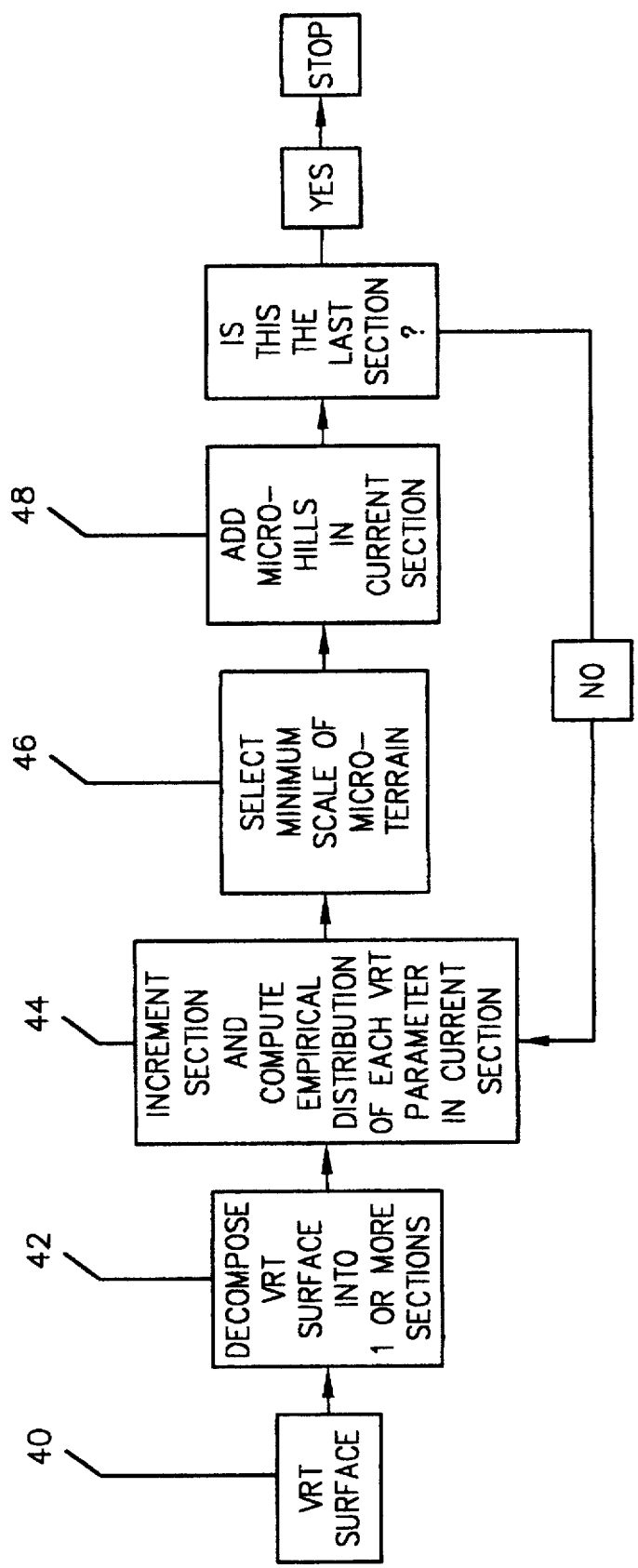
FIG. 6 is a flow chart of the methodology for the addition of realistic micro-terrain to a variable resolution terrain surface.
Figures 7A, 7B:
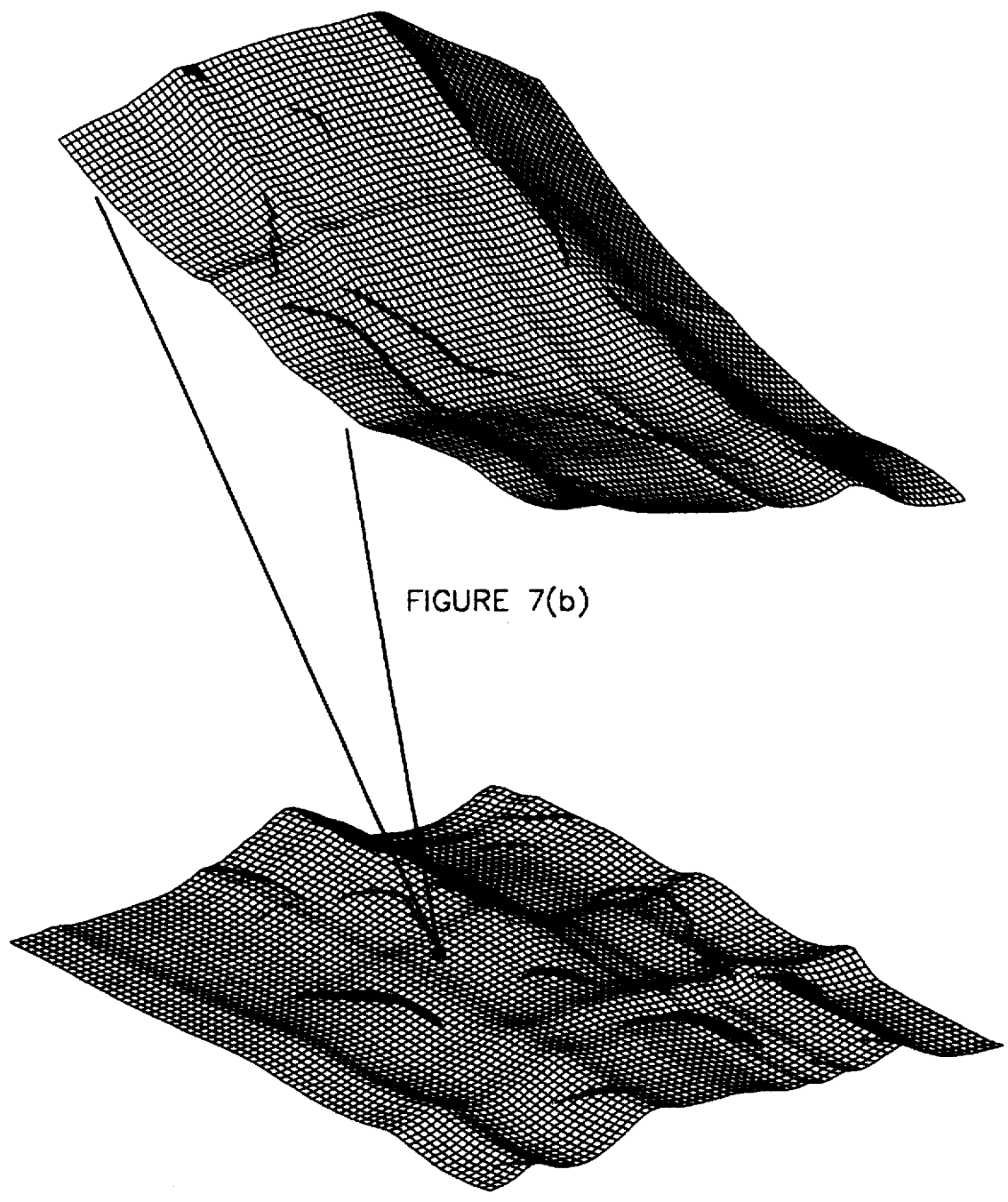
FIGS. 7(a) and 7(b) are simple graphical representations of a typical example resulting from the addition of micro-terrain by the process of FIG. 6.

FIG. 6 is a flow chart of the methodology for the addition of realistic micro-terrain to a variable resolution terrain surface. The variable resolution terrain surface in block 40 can represent either a piece of generic terrain or an existing geographical area. If the surface is not homogeneous, i.e., of a single terrain type, it is decomposed into homogeneous sections (block 42). If the variable resolution terrain surface is homogeneous, there will be only one section. For each section, an empirical statistical distribution is computed for each variable resolution terrain parameter (block 44). The minimum scale value, $s_{micro}$, for the micro-terrain to be added is selected (block 46), and, using the empirical distributions, the micro-hills are created, the scales of which are computed according to the cumulative distribution function $$\int_{t=s_{micro}}^{t=s} Kr^{-2}dt = K(1/s_{micro} - 1/s),$$

and the micro-hills are added to the variable resolution terrain surface (block 48). This cumulative distribution function is the same as the one used to create generic variable resolution terrain surfaces, except for the lower limit of integration and the restriction that s must be smaller than the smallest scale value of any hill in the section of the variable resolution terrain surface under consideration. This process continues until micro-hills have been added to each variable resolution terrain section. FIG. 7 is a simple graphical representation of a typical example resulting from the addition of micro-terrain by this process. Here, micro-hills have been added to a very small section of a variable resolution terrain surface and the result has been magnified to make visible the very small scale micro-terrain features.

Figure 8:
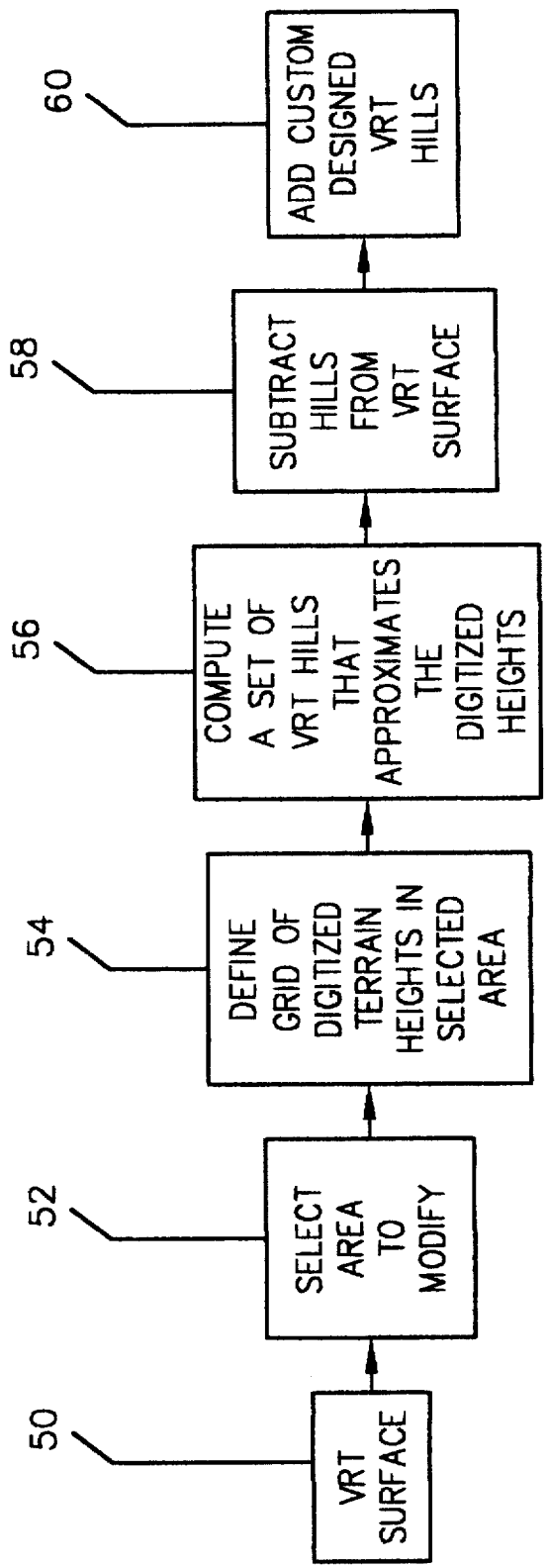
FIG. 8 is a flow chart of the methodology for the dynamic modification of a variable resolution terrain surface.
Figures 9A, 9B:
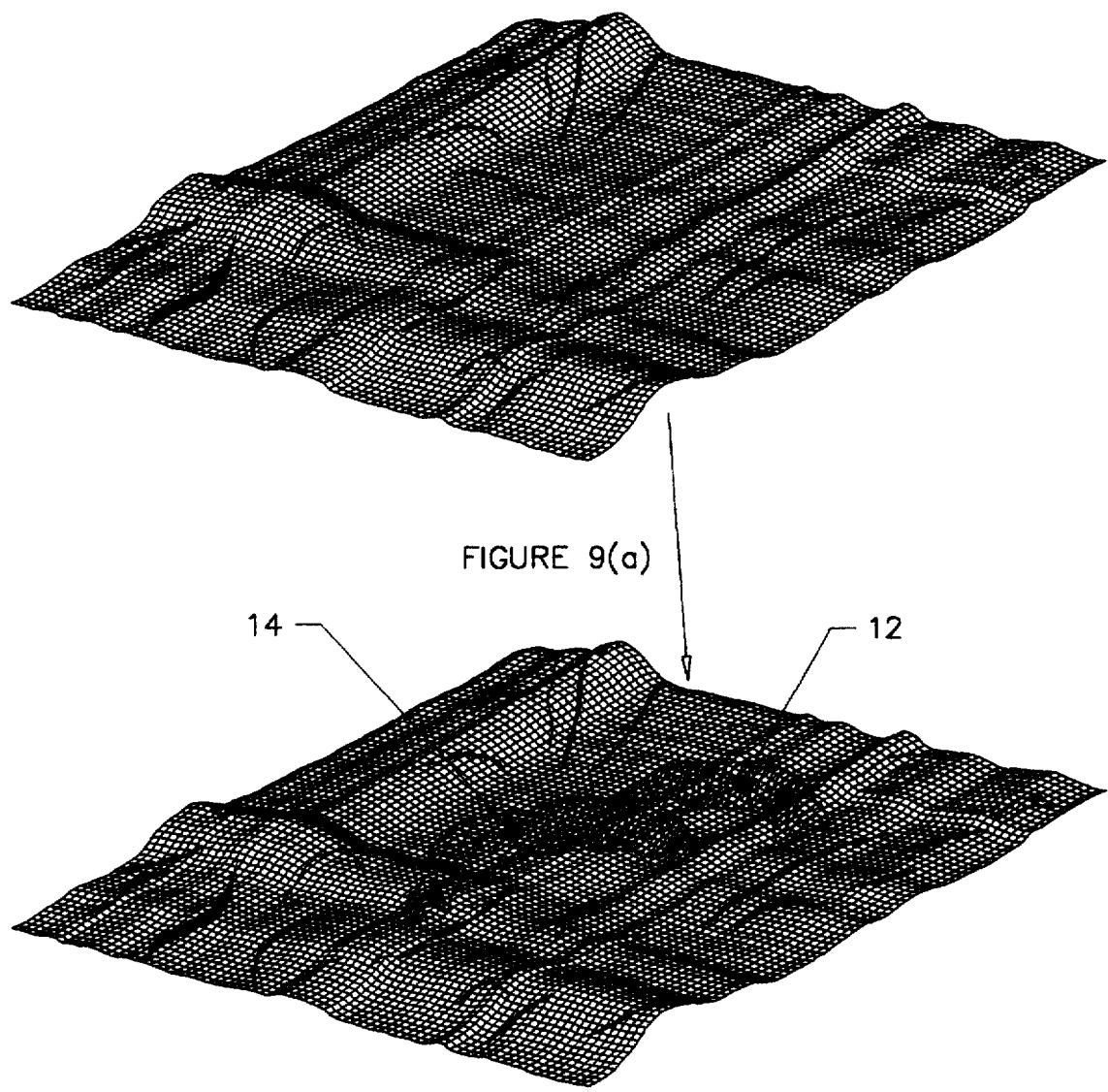
FIGS. 9(a) and 9(b) depict the result of dynamic terrain modification caused by two successive meteor impacts on a variable resolution terrain surface.

The methodology of the present invention allows for the dynamic modification of terrain, i.e., the changing of a variable resolution terrain representation, whether of generic or actual terrain, after it has been initially defined. The modification of terrain can represent either natural alteration, such as a meteor impact, or man made alteration, such as results from road building or other construction improvements. FIG. 8 is a flow chart of the methodology for the dynamic modification of a variable resolution terrain surface. The variable resolution terrain surface in block 50 can represent either a piece of generic terrain or an existing geographical area. An area of the variable resolution terrain surface is selected for modification (block 52) and a grid of digitized terrain heights is defined in that area by sampling the defining mathematical formula for the variable resolution terrain surface (block 54). In much the same way as in the logic for the representation of an existing geographical area, a set of variable resolution terrain hills is computed that approximates the digitized heights to within a predefined threshold value (block 56). These hills are then subtracted from the variable resolution terrain surface (block 58). The effect of this operation is to "smooth out" the selected area, effectively removing all previously existing terrain features in the area, while still retaining all of the benefits of the variable resolution terrain formulation. Finally, custom designed variable resolution terrain hills are added to the selected area (block 60). These hills are selected according to the type of modification desired. Typically, man made modifications will require variable resolution terrain hills with a small value (near 0) for the $\alpha_k$ parameters while natural modifications will require larger values of $\alpha_k$ (closer to 1). FIGS. 9(a) and 9(b) depict the result of dynamic terrain modification caused by two successive meteor impacts on a variable resolution terrain surface. FIG. 9(a) depicts the surface prior to the successive meteor impacts. Referring to FIG. 9(b), the first meteor impact 12 resulted in the destruction of the previously existing terrain features in its area, while the second meteor impact 14 resulted not only in the destruction of the previously existing terrain features in its area, but also in the destruction of that part of the crater wall formed by the first meteor impact that happened to lie on the area of the second impact.

Figure 10:
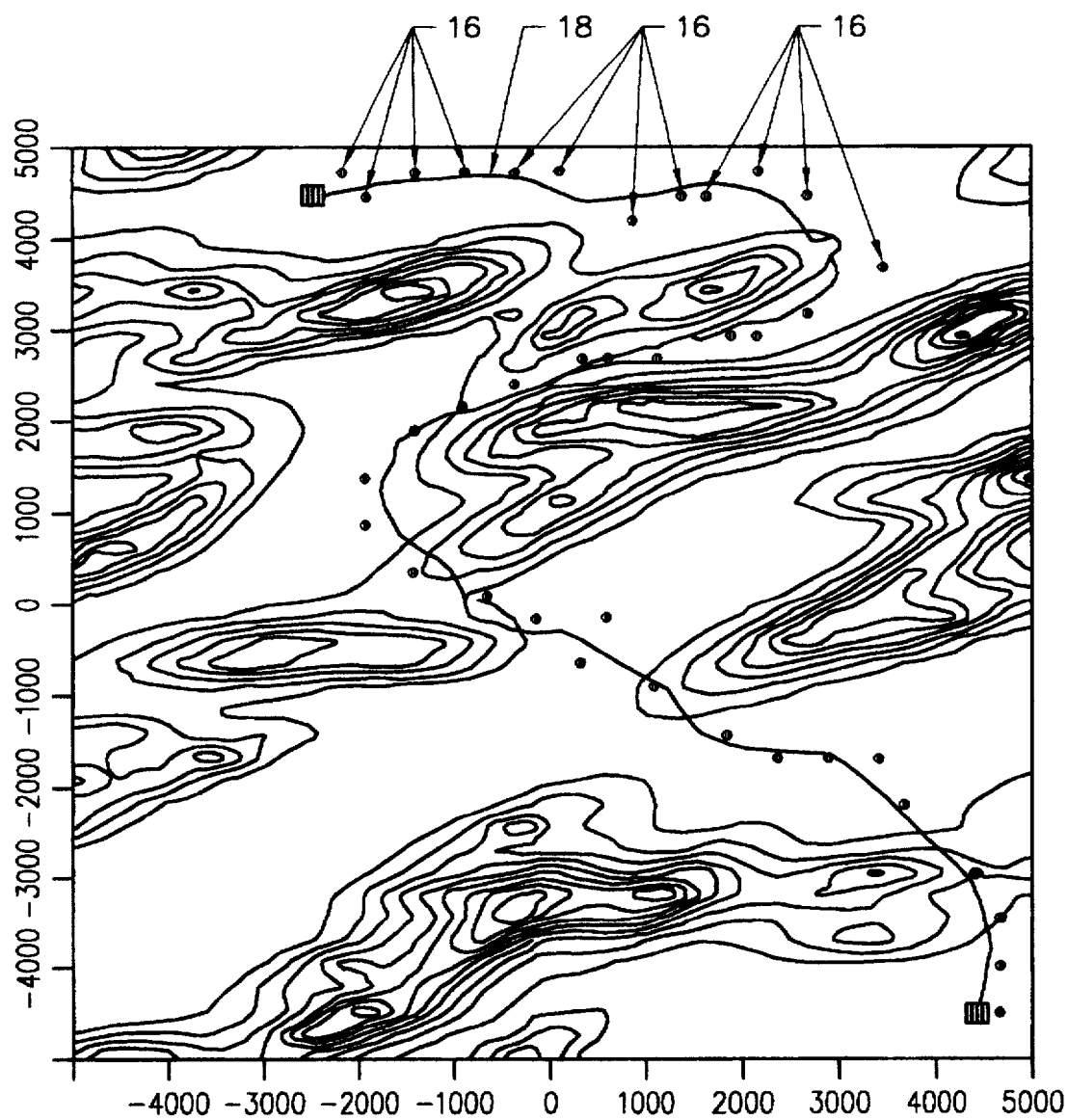
FIG. 10 illustrates the construction of a passable route through terrain.

The methodology of the present invention allows for the construction of routes and road networks. This relies heavily on the availability of both terrain heights and terrain slopes at any point. FIG. 10 illustrates this method. For the construction of off-road travel routes, the location of passable areas of the terrain can be represented by waypoints 16, computed from the variable resolution terrain information. By stringing together a set of these waypoints 16, a passable route 18 through the terrain can be constructed. It is not necessary for route 18 to actually pass through the waypoints 16, but rather just pass through the neighborhood of each waypoint 16. This gives a more realistic, smoother route, that connects two points, while avoiding difficult to traverse intervening areas. The use of realistic micro-terrain from the variable resolution terrain representation is critical to this process.

Figure 11:
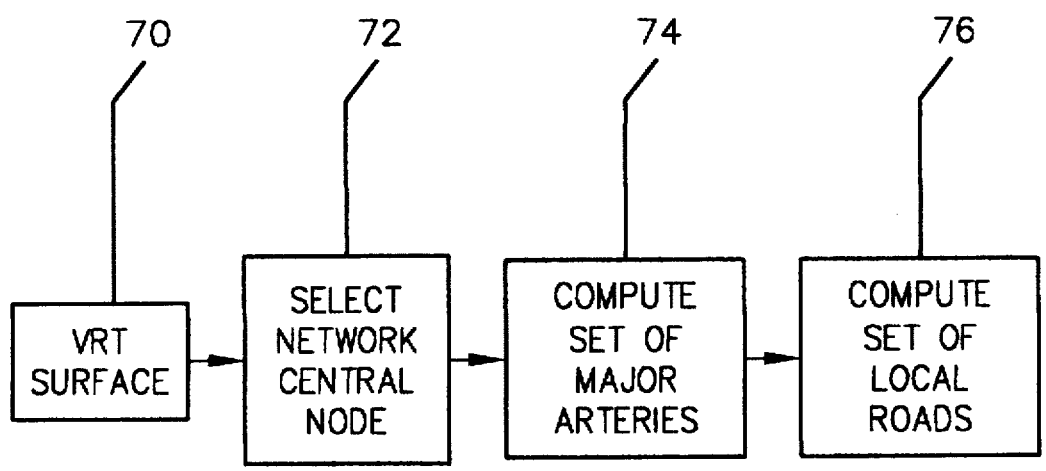
FIG. 11 is a flow chart of the methodology for the construction of a network of roads.
Figure 12:
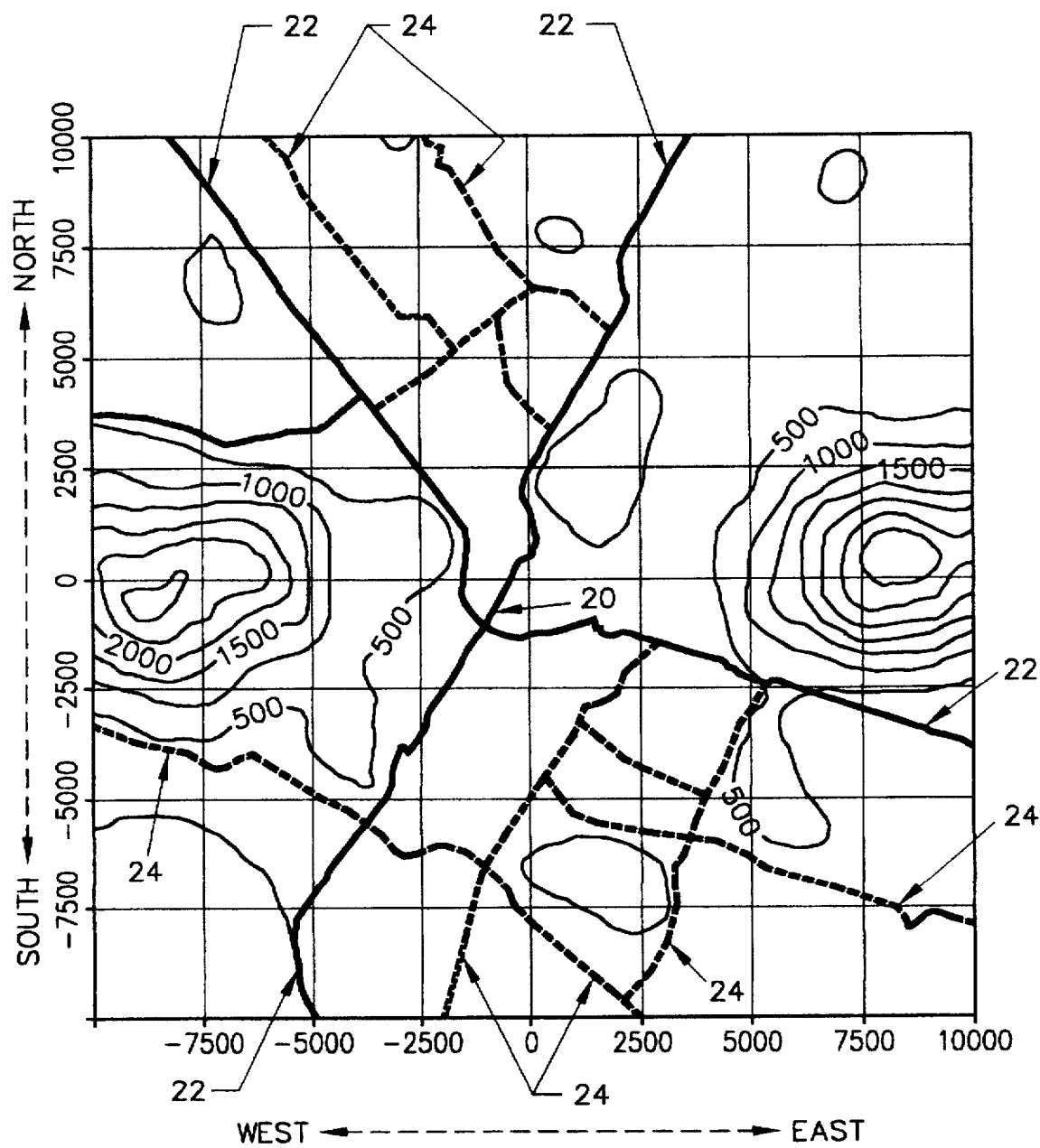
FIG. 12 is a representation of the results achieved by the process of FIG. 11.

For the construction of road networks, the same terrain height and slope information is used in a somewhat different way. The process is illustrated in FIG. 11. The starting point of the process (block 70) is a variable resolution terrain surface. A point on the surface is selected as the central node for the network (block 72), and then, using the detailed, continuously available variable resolution terrain height and slope data, the major arteries are calculated, radiating from the central node (block 74). Following this, the local roads are calculated, branching off from the major arteries (block 76). The location of all roads is calculated based upon typical vehicle gradient and sideslope restrictions, and uses the variable resolution terrain methodology to calculate the necessary terrain gradients and sideslopes. FIG. 12 illustrates this process, showing both the central node 20 and major arteries 22 (solid lines) and the local roads 24 (dashed lines).

This methodology allows for the use of reaction diffusion equations in connection with variable resolution terrain methodology to represent terrain related processes such as water flow over terrain and route selection and movement over terrain. The general form of the partial differential equation that governs these phenomena is given by the following system of equations:

$$s_{1t} = D_{1x}s_{1xx} + D_{1y}s_{1yy} + V_{1x}s_{1x} + V_{1y}s_{1y} - I_1(s_1, s_2, \ldots, s_n),$$

$$s_{2t} = D_{2x}s_{2xx} + D_{2y}s_{2yy} + V_{2x}s_{2x} + V_{2y}s_{2y} - I_2(s_1, s_2, \ldots, s_n),$$

$$s_{nt} = D_{nx}s_{nxx} + D_{ny}s_{nyy} + V_{nx}s_{nx} + V_{ny}s_{ny} - I_n(s_1, s_2, \ldots, s_n),$$

The variables $s_1, s_2, \ldots, s_n$ represent various species, ranging from liquids such as water, fog, or smoke to collections of discrete entities such as groups of people or vehicles. The expression $D_{ix}s_{ixx} + D_{iy}s_{iyy}$ models the diffusion, or random movement, of the $i^{th}$ species. The expression $V_{ix}s_{ix} + V_{iy}s_{iy}$ models the convective, or directed, movement of the $i^{th}$ species. The term $I_i(s_1, s_2, \ldots, s_n)$ models the interaction of the various species. In military applications, for example, the species would be armies and the vehicles, tanks or supply trucks. The methodology of the present invention incorporates terrain information such as slope and terrain height into the coefficient functions $V_{ix}s_{ix}$ and $V_{iy}s_{iy}$ to model the flow of substances down and around the hills on the terrain. Similar techniques are used to model movement over terrain.

The combined use of reaction diffusion equations and variable resolution terrain methodology is not limited to the applications listed here, but is equally applicable in the representation of any formally similar phenomena in which a surface of any kind is represented. For example, the surface of a tooth can be represented using the methodology of the present invention. For instance, the methodology of the present invention may be used in the construction or enhancement of software used in the health care industry, in which any part of the body is mapped and rendered, including, but not limited to, the mapping of the face, the surface of teeth, and the brain, using instruments such as magnetic resonance imagery and x-ray machines. Another example of the applicability of the methodology of the present invention is in the construction or enhancement of software for computer-aided design, computer-aided manufacturing, and computer-aided engineering, including, but not limited to, software tools used in architecture, mechanical engineering, electrical engineering, structural engineering, and civil engineering in the design, construction, and management of buildings and industrial plants.

Yet another example is in the construction or enhancement of software for geographic information systems for mapping functions and for the determination of land suitability, terrain mobility, and hydrologic characteristics, including, but not limited to, underwater earth-moving activities, landscape design, and land development.

A further example is in the construction or enhancement of software for compliance with government regulations, including, but not limited to, environmental technologies for analysis of hazardous waste sites and pollution abatement.

The methodology is also applicable in the construction or enhancement of software for computer games, including, but not limited to, the simulation of war, flight, sports, travel, history, and geography.

Another example of the applicability of the methodology is in the construction or enhancement of software for scientific purposes in which terrain representation is used, including, but not limited to, the range testing of aircraft, missiles, automobiles, and other vehicles, satellite testing and evaluation, vehicle crash and endurance testing, and the evaluation of fire control systems for weapon systems.

A further example is in the construction or enhancement of software in geoscience, including, but not limited to, the generation, interpretation, and management of subsurface maps for three dimensional modeling and analysis.

Yet another example is in the construction or enhancement of software for the modeling and simulation of natural and man made disasters, including, but not limited to, torrential rains and floods, landslides, mudslides, avalanches, and chemical spills, to be used as an aid in crisis management planning.

Inasmuch as the present invention is subject to many variations, modifications, and changes in detail, it is intended that all matter described throughout this specification and shown in the accompanying drawings be interpreted as illustrative and not in a limiting sense. Moreover, the scope of applicability of the invention is not limited strictly to terrain representation, but rather includes all formally similar fields in which a surface of any kind is represented. Accordingly, it is intended that the invention be limited only by the spirit and scope of the appended claims.

We claim:

1. A method for representing terrain and terrain-related phenomena comprising the steps of:

(a) specifying a density parameter for the terrain;

(b) selecting a range of scales for terrain features;

(c) determining a total number of hills to be constructed;

(d) obtaining mathematical distributions of terrain features for each hill to be constructed;

(e) generating values for the location and shape of each hill to be constructed; and (f) superposing the values with an arbitrarily oriented plane to form a variable resolution terrain surface representative of the terrain or terrain-related phenomena;

wherein the step of obtaining mathematical distributions of terrain features for each hill to be constructed is performed according to the equation:

$$\int_{s=s_{min}}^{s=\infty} Ks^{-2}ds = \frac{K}{s_{min}},$$

where s is the scale of the terrain feature selected in step (b) and K is the density parameter specified in step (a);

further comprising the step of adding user selectable hills to the terrain surface; wherein the values for the location and shape of each hill to be constructed are generated according to the equation:

$$f_k(x,y) = s_k h_k \exp\left(-\left\{\frac{1}{s_k \rho_k}[\alpha_k E_k(x,y) + (1-\alpha_k)M_k(x,y)]\right\}^{\sigma_k}\right),$$

-continued where $$E_k(x,y) = [a_1(x-\xi_k)^2 - a_2(x-\xi_k)(y-\eta_k) + a_3(y-\eta_k)^2]^{\frac{1}{2}},$$

$$a_1 = \epsilon_k - \left(\epsilon_k - \frac{1}{\epsilon_k}\right)\cos^2\lambda_k,$$

$$a_2 = \left(\epsilon_k - \frac{1}{\epsilon_k}\right)\sin 2\lambda_k,$$

and $$a_3 = \epsilon_k - \left(\epsilon_k - \frac{1}{\epsilon_k}\right)\sin^2\lambda_k,$$

and $$M_k(x,y) = \max\left(\epsilon_k|A_1(x,y)|, \frac{1}{\epsilon_k}|A_2(x,y)|\right),$$

where $$A_1(x,y) = (x-\xi_k)\cos\lambda_k + (y-\eta_k)\sin\lambda_k,$$

and $$A_2(x,y) = (y-\eta_k)\cos\lambda_k - (x-\xi_k)\sin\lambda_k,$$

$\xi_k$, and $\eta_k$ govern the location of the center of the hill, $h_k$, $\rho_k$ and $s_k$ govern the hill's height and width, $\epsilon_k$ governs the eccentricity of the hill, $\lambda_k$ governs the hill's orientation, $\alpha_k$ governs the slope, and $\sigma_k$ governs the shape of the horizontal cross section of the hill.

2. A method of representing a specific geographic area, according to claim 1, wherein the step of generating values for the location and shape of each hill to be constructed comprises:

(a) detrending a set of measured heights to produce a set of residual heights;
    (b) locating the residual height of maximum deviation and the location of the residual height;
    (c) defining a hill whose center is at or near the location of the residual height and whose height is substantially equal to the residual height;
    (d) subtracting the defined hill from the set of residual heights to create a new set of residual height;
    (e) locating the new residual height of maximum deviation and the location of the new residual height; and
    (f) repeating steps (c) through (e) until all of the new set of residual heights are smaller in absolute value than the predefined threshold value.

3. A method according to claim 2, wherein the step of detrending the set of measured heights is achieved by fitting a plane through the measured heights and subtracting the height of this plane from each of the measured heights.

4. A method of adding micro-terrain to the terrain surface, according to claim 1, wherein the step of adding realistic micro-terrain comprises the steps of:

(a) decomposing the micro-terrain into homogenous sections;
    (b) determining an empirical statistical distribution for each variable resolution terrain parameter for a section;
    (c) selecting the minimum scale value for the micro-terrain;
    (d) creating the micro-hills for a section;
    (e) repeating steps (b) through (d) for each section; and
    (f) adding the micro-hills to the terrain surface.

5. A method according to claim 4, wherein the step of creating the micro-hills comprises determining the scales of the micro-hill according to the cumulative distribution function $$\int_{t=s_{micro}}^{t=s} Kr^{-2}dt = K(1/s_{micro} - 1/s),$$

where $s_{micro}$ is the minimum scale selected in step (b) and K is the density parameter used in step (a).

6. A method of modifying the terrain surface after initial definition, according to claim 1, wherein the step of modifying the terrain surface comprises:

(a) selecting an area of the surface to be modified;
    (b) defining a grid of digitized terrain heights in the area;
    (c) determining a set of variable resolution terrain hills that approximate the digitized heights to within a predefined threshold value; and
    (d) subtracting the set of variable resolution terrain hills from the variable resolution terrain surface.

7. A method according to claim 6, further comprising the step of adding user selectable hills to the terrain surface.

8. A method of automatically selecting a network of travel routes over the variable resolution terrain surface, according to claim 1, wherein the step of automatically selecting a network of travel routes comprises the steps of:

(a) selecting a point on the variable resolution terrain surface as the central node for the network;
    (b) determining a set of major arteries; and
    (c) determining a set of local roads.

9. A method according to claim 8, wherein the steps of determining a set of major arteries and determining a set of local roads comprises calculating necessary terrain gradients and sideslopes.

10. A method of representing terrain related processes, according to claim 1, wherein the step of representing terrain related processes comprises using reaction diffusion equations.

* * * * *